May 14, 1963  C. A. DAMM  3,089,387
CINCTURE-TYPE SUSPENSION BAND APPARATUS
Filed Jan. 27, 1960  3 Sheets-Sheet 1

INVENTOR.
CARL A. DAMM
BY
AGENT

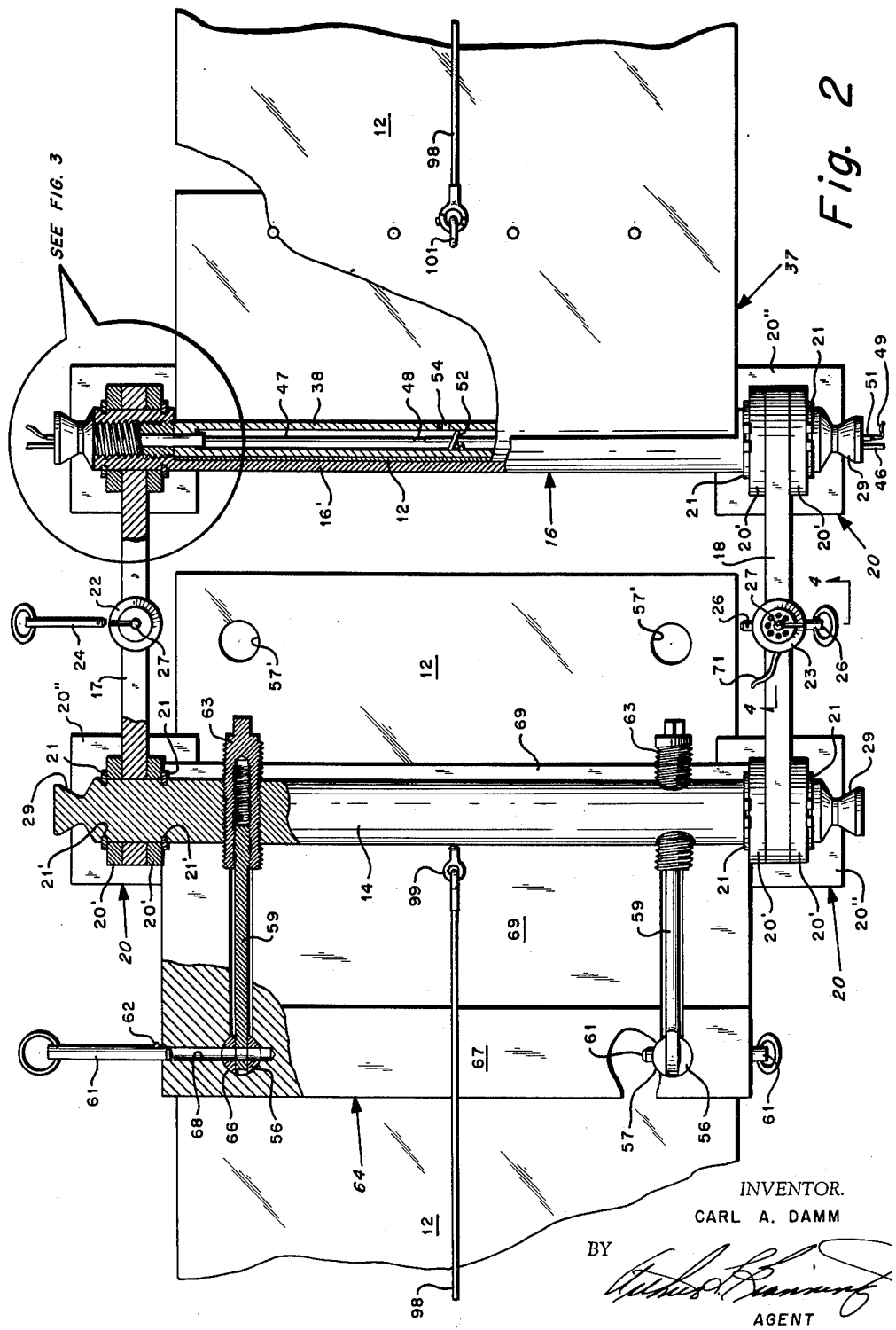

May 14, 1963 C. A. DAMM 3,089,387
CINCTURE-TYPE SUSPENSION BAND APPARATUS
Filed Jan. 27, 1960 3 Sheets-Sheet 3
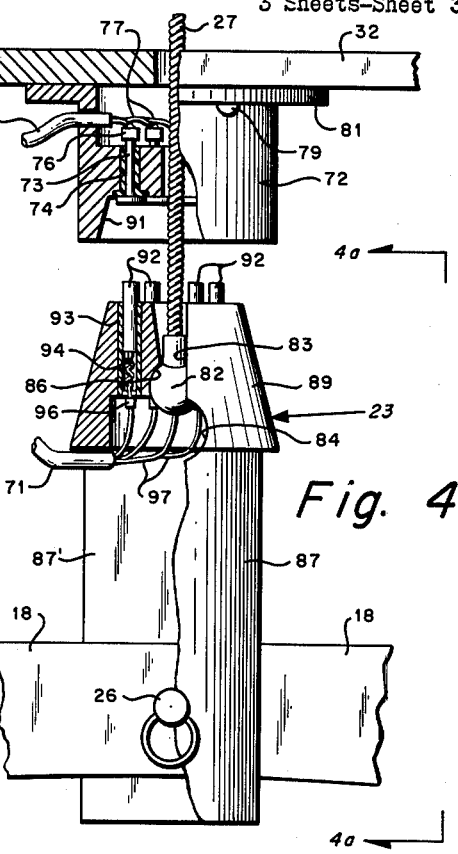
Fig. 4
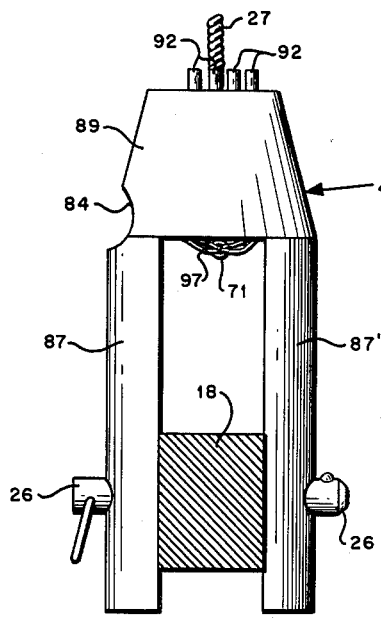
Fig. 4a
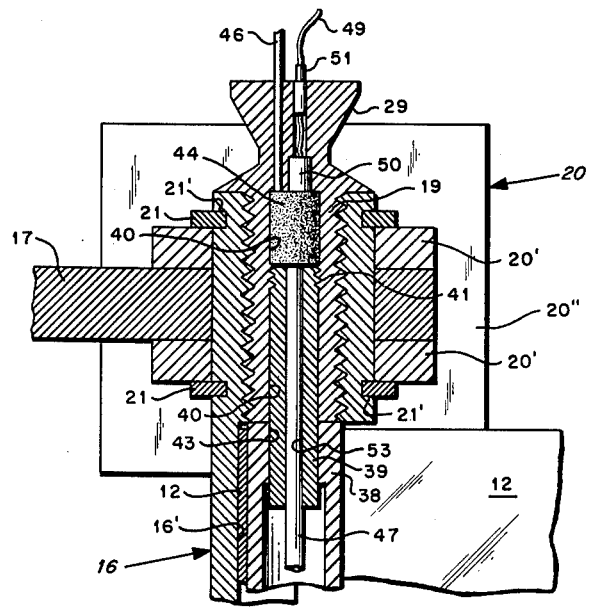
Fig. 3
INVENTOR.
CARL A. DAMM
BY
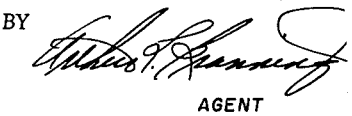
AGENT United States Patent Office 3,089,387
Patented May 14, 1963

3,089,387
CINCTURE-TYPE SUSPENSION BAND APPARATUS
Carl A. Damm, Upper Black Eddy, Pa., assignor to the United States of America as represented by the Secretary of the Navy
Filed Jan. 27, 1960, Ser. No. 5,077
9 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This invention relates to a universal cincture-type suspension band apparatus and more particularly to a universal cincture-type suspension band apparatus for hoisting, securing and releasing a store in an aircraft.

Suspension and release devices for handling airborne stores such as weapons, missile dispensers and streamlined tanks have heretofore entailed complicated and heavy mechanisms to effect hoisting, securing and releasing of the store. Typically, the release mechanisms in the prior art comprise several hooks secured in a rack mounted in the aircraft and engaging mating lugs fixed to and protruding from the periphery of the store. Release is effected by movement of the hooks out of the lugs. To prevent movement of the secured store due to roll, yaw or pitch of the aircraft when in flight, anti-sway braces are required therefor. These braces act like a tension jack for pushing the store away from the rack and into positive loading on the hooks.

Devices of this type, as understood in the art, manifest many serious disadvantages. The complexity of the release mechanisms necessarily dictates precision parts; but even these parts are invariably susceptible to malfunction imposed by severe service conditions of continuous and serious physical loading, and extreme changes in environment and climate. With reference to the stores suspended thereby, the mating lugs, anti-sway brace adaptors and guides usually protrude from the surface of the store, hence they disturb the aerodynamic balance of stores such as bombs, aerial torpedoes and sea mines which are otherwise streamlined for obtaining a predictable trajectory when the store is dropped. The stores and racks therefor are also different in the number of hooks and mating lugs, in the hook shapes, and in the spacing of the hooks. Interchangeability between store types in a specific rack is therefore seriously limited. Respecting the anti-sway braces, adjustment of the braces to eliminate slack motion and to align a particular store cannot be made until the store is hoisted into the aircraft. The great deal of time consumed in securing a store also involves grounding time of the aircraft. This factor is especially undesirable for modern carrier-based aircraft where the store is a bomb and the rearming of the aircraft must be kept at a maximum rate.

The very nature of the prior art concepts of store suspension invariably result in many parts being subjected to high loads which consequently increase the incidence of failures. Designing each part for such loads usually produced a heavy and cumbersome device.

The general purpose of this invention is to provide a cincture-type suspension band apparatus which embraces all the advantages of similarly employed store hoisting, securing and releasing systems for aircraft and possesses none of the aforementioned disadvantages. To attain this, the present invention contemplates a novel release mechanism in combination with a unique cincture-type suspension band affording a store suspension apparatus of modular design capable of being adapted to stores of any size and to any one of several types of aircraft. The apparatus of the present invention is also self-aligning in the aircraft and obviates the need for anti-sway braces.

It will be noted that the release mechanism of the present invention further contemplates only a few parts of simple design whereby an improved result is attained with a less number of components than are essential in the prior art devices. More particularly, the release mechanism concentrates the high loads to only four regions; and the loads are resolved into simple shear at these regions. Release is effected at one or more of these regions by movement of only one part per region. The degree of precision in parts required by the prior art devices is not required in any of the parts comprising the present invention. In addition, no consequential adverse effects are produced as a result of the new and simplified arrangement.

It is an object of the present invention to provide a novel universal store suspension apparatus for hoisting, securing and releasing a store of any size in any one of several types of aircraft wherein the apparatus utilizes cincture-type band suspension.

Another object of the invention is the provision of a novel means for self-aligning and securing a store in an aircraft thereby obviating the need for anti-sway braces.

Yet another object of the invention is to provide a simplified suspension apparatus for hoisting, securing and releasing a store in an aircraft whereby high loads are concentrated in a few parts.

A further object of the invention is directed to a novel cincture-type suspension band apparatus of the character to be described herein and incorporating a unique cartridge-actuated release mechanism for dropping a store from the aircraft at a mandatory point in time.

A still further object of the invention is to provide a novel cincture-type suspension band apparatus of the character to be described herein and incorporating a unique means for adjusting the band for different size stores.

Still another object of the invention is the provision of a novel cincture-type suspension band apparatus of the character to be described herein and incorporating a unique means for concomitantly securing a store in an aircraft and connecting electrical devices of the store and the aircraft.

These and other objects and many of the attendant advantages of the present invention will be readily appreciated as the same become better understood by reference to the following detailed description when considered in connection with the accompanying drawings, wherein:

FIG. 1 diagrammatically illustrates an elevational end view of a store as the store is being hoisted into an aircraft by a universal cincture-type suspension band apparatus, and further illustrates a band retractor in three distinct positions during its operation;

FIG. 2 is a layout view, partially in cross-section, of the apparatus of FIG. 1 as viewed from above for showing further details;

FIG. 3 illustrates an enlarged cross-sectional view of the elements encircled in FIG. 2 illustrating further details not visible in FIG. 2;

FIG. 4 represents in a side elevation an enlarged partially cross-sectional view of a hoisting clevis taken on the line 4—4 of FIG. 2; and FIG. 4a represents another elevational view of the hoisting clevis taken on the line 4a—4a of FIG. 4.

Figure 1:
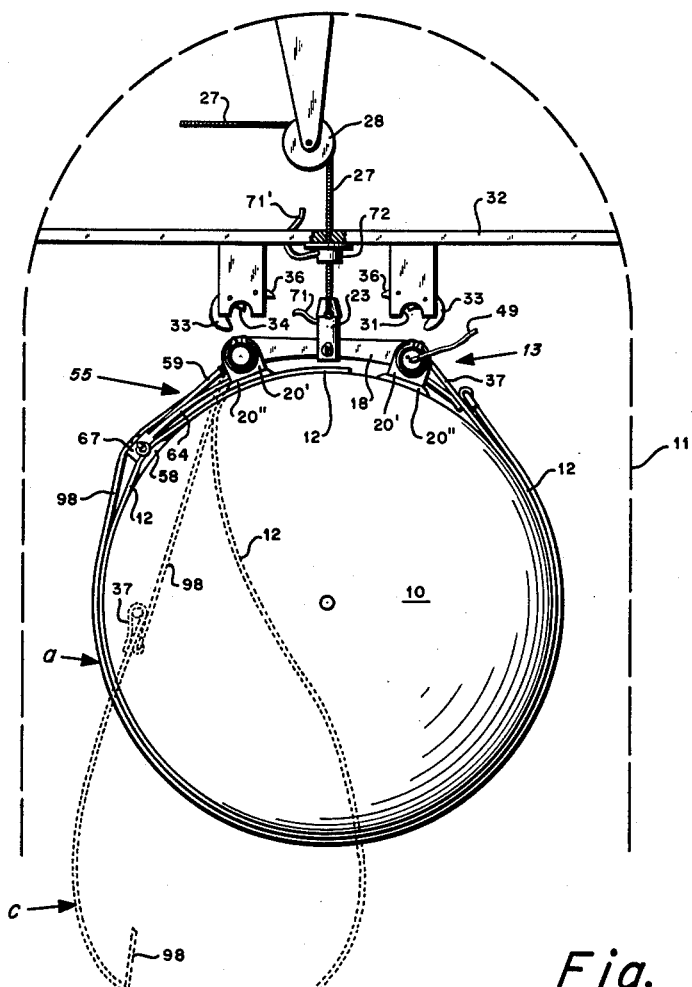

Referring to the drawings, wherein like reference characters designate like or corresponding parts throughout the several views, there is shown in FIG. 1 a fragmentary front view of a store 10 suspended in an aircraft fuselage 11, shown partially in hidden outline. A cincture-type suspension band apparatus comprising a band 12 is secured about the periphery of the store 10 by a release mechanism shown generally by the numeral 13. As best seen in FIG. 1 taken with FIGS. 2 and 3, the mechanism 13 is defined by two parallel members identified as a cylindrical shaft 14 and a cylindrical member 16 which are spaced apart at their ends by crossties 17 and 18. Each terminal of the member 16 is extended by a trunnion 19 threaded into member 16 so that the overall length of member 16 is the same as shaft 14. The ends of shaft 14 and member 16 are supported in bifurcated extension 20' of chocks 20 which radially space the shaft 14 and member 16 from the store 10. The chocks 20 and crossties 17 and 18 are prevented from movement along the axes of shaft 14 and member 16 by retainer rings 21 which are respectively spring biased into ring grooves 21' on shaft 14 and member 16. As shown in FIG. 1, the chocks 20 are further defined by flanges 20" having generally arched surfaces for abutting the curved store surface 10. The flanges 20" are decreasing in thickness toward opposite ends of the arched surfaces thus rendering the flanges 20" resilient and compliant with the surface of the store 10.

Intermediate of the ends of each crosstie 17 and 18 hoisting clevises 22 and 23, respectively, are pivotally connected by detented clevis pins 24 and 26, respectively, through bifurcated ends of clevises 22 and 23. The other ends of each clevis 22 and 23 have spherical receptacles adapted for receiving and seating ball-ends of hoisting cables 27. The cables 27 are connected over pulleys 28 to a winch or other hoisting means not shown.

The ends of shaft 14 and member 16 are further defined by circumferential aligning grooves 29. Four notched sockets 31 are fixed to rigid airplane structure represented as a crossbeam 32. The grooves 29 are tapered so that as the store 10 is hoisted into the airplane toward crossbeam 32, the grooves 29 engage the sockets 31, align the store 10 and further provide bearing contacts for restraining movement or swaying of the store 10 due to roll, yaw or pitch of the aircraft. It will be obvious to one skilled in the art that the lateral and longitudinal spacing of the grooves 29 and their corresponding notches 31 with respect to each other determines their effectiveness as anti-sway bracing. The spacing largely depends upon the size and weight of the store to be secured in the aircraft. It is contemplated that the variations in the lateral and longitudinal spacing can be maintained few in number but accommodate a large number of variations in stores. Pivotally connected hooks 33 in sockets 31 lock the release mechanism 13 in a secured position when the grooves 29 move upward against hook portions 34. When the mechanism is fully hooked, pawls 36 latch the hooks 33 against opening after the hoisting cables 27 are removed and the store 10 has exerted a downward force on the hooks 33.

The member 16 is further defined by a channel 16' along the axis of member 16 for a length equal to at least the width of the band 12. The channel 16' receives a loop 37 of band 12. A tubular barrel 38 is inserted in the eye of band loop 37 for selectively securing the band loop 37 in member 16. The barrel 38 is substantially the same length as the channel 16'. The ends of the barrel 38 are adjacent to the inner faces of trunnions 19. Trunnion bolts 39 are slideably inserted in cylinders 40 of trunnions 19 and are secured at one end by shearing threads 41. Each bolt 39 protrudes into a bore 43 in an adjacent end of barrel 38. It will be noted that each bolt 39 is subjected to a simple shear stress perpendicular to the longitudinal axis and is of sufficient strength to retain band loop 37 in the member 16 under heavy loadings on the band 12.

Each trunnion 19 also defines an explosive chamber 40 for a cartridge 44 such as pentraerythritol tetranitrate (PETN). A low energy detonating cord (LEDC) 46 is connected to the cartridge 44. It is contemplated that the detonating cord 46 may be mechanically actuated from a remote location as by a pilot. A sympathy tube 47 and a connector 48 afford communication between the explosive chambers 40 at each end of member 16 to assure virtually simultaneous firing of the cartridges 44. As an alternative means for firing the release mechanism 13, electrical ignition conductor 49 and primer 50 are shown for firing the cartridges 44. Electrical connections to the elements are by means of jack 51.

The bores 43 of barrel 38 serve not only as bearings for the bolts 39 but also constitute a continuation of the cylinders in trunnions 19. The bore length is approximately equal to the inserted bolt length. The remainder of the barrel bore is enlarged to a greater diameter. By this construction, when the release mechanism 13 is fired, the bolts 39 project toward each other and down the center of the barrel 38 where they are arrested by a barrier 52. As the bolts 39 begin to move, the bearing contact area is diminished. Hence the reduction in sliding friction enables the bolt 39 to quickly clear the interfaces of the ends of the barrel 38 and the trunnions 19. The enlarged section also reduces the possibility of either of the expended bolts 39 hitting the barrier 52 and bouncing back to pin the barrel 38 to either trunnion 19 again before the suspended store 10 could fall away. Additionally, the barrier 52 is offset of the center of barrel 38 to assure deflection of the bolt 39 in the enlarged section of the barrel 38. In the specific embodiment illustrated, the bolt 39 includes a small clearance drilled hole 53 for sliding over the sympathy tube 47. Both cartridges 44 are fired before the bolt 39 strikes the connector 48 and disconnects the sympathy tube 47. Devious routes may be taken by the tube 47, such as externally of the barrel 38. A pressure relief hole 54 communicates the enlarged portion of barrel 38 with the ambient atmosphere for relieving the compressed gases after the bolts 39 are projected inwardly. The hole 54 is placed in an area not covered by the member 16 or band 12 in order to assure unrestricted access to the atmosphere. The bolt 39 is welded or otherwise fastened to the band 12 to prevent the bolt 39 from dropping out of the aircraft after store release is effected.

The suspension band apparatus further comprises an adjusting device illustrated generally by the numeral 55. The band 12, being selectively connected to the release mechanism 13 by the band loop 37 and barrel 38, is wrapped around the store 10. The end opposite the loop 37 of the band 12 underlays the release mechanism an amount depending on the circumference of the store 10 with respect to the length of the band 12. The underlay is desirable to assure a tight cincture about the store 10. A pair of anchor fittings 56 protrude radially outward of store 10 through holes 57 in the band 12. Additional holes such as holes 57' may be provided for adapting the band 12 to different size stores. The fittings 56 are retained in the holes 57 by flanges 58 at one end of each fitting 56 and are held in place on the periphery of the store 10 by the band 12 when tightly cinctured. The other end of each fitting 56 is bifurcated to form a clevis for pivotally connecting eye bolts 59 by pins 61. Detents 62 retain the pins 61 in the fittings 56. The eye bolts 59 are connected to shaft 14 by couplings 63. Each coupling 63 comprises internal threads for receiving a threaded end of one of the bolts 59 and external threads for mating with internal threads in shaft 14. The threads are pitched in a manner whereby turning of the coupling 63 adjusts the effective length of the eye bolts 59, hence affords tight cincturing of the band 12 about the store 10. A spacer plate 64 is superimposed on the band 12 and receives the fittings 56 in holes 66 located in a thick portion 67 of plate 64. Access of pins 61 to the fittings 56 is through pin holes 68. A thin portion 69 of plate 64 is wedged between the chock extensions 20' on shaft 14. The plate 64 provides a reinforcing means across band 12 at the fittings 56 to add rigidity to the adjusting device 55 thereby resisting any tendency of the band 12 to bow between the fittings 56 and skew the eye bolts 59 when the airplane accelerates and creates forces parallel to the longitudinal axis of the store 10.

Another function of hoisting clevis 23 is as an electrical connector for umbilical cables 71 and 71' connecting various electrical gear, not shown, in the store 10 to other electrical gear, also not shown, in the airplane. As best shown in FIGS. 3 and 3a, the hoisting cable 27 passes down through the center of an electrical receptacle 72 which is fixed by bolts 79 in flange 81 to crossbeam 32 in the airplane. The electrical receptacle 72 includes a plurality of concentrically disposed receptacle contacts 73 isolated by insulators 74, and are connected at receptacle lugs 76 by means not shown to conductors 77 in cable 71' which leads to the electrical gear, not shown, in the airplane.

Hoisting clevis 23 structurally differs from hoisting clevis 22 only to the extent that it includes facilities for making electrical connections. Thus, FIGS. 3 and 3a, representing the details of clevis 23, also include all of the details of clevis 22, and the latter is not illustrated as a separate figure in the drawings.

The cable 27, which terminates with ball 82 swaged or otherwise fastened thereto, is inserted in the hoisting clevis 23 through a radial slot 83 enlarged at section 84 to admit the ball 82. As the store 10 is hoisted into the secured position, the ball 82 is seated against a spherical surface 86 of the clevis 23. The bifurcated lower end of clevis 23 forms two sides 87 and end 87' which straddle the crosstie 18 and are pivotally secured by the detented clevis pin 26 passing through coaxial holes of the respective sides 87 and 87'.

The clevis 23 is further characterized by a frustoconical upper end 89 tapered to positively seat in a mating well 91 in receptacle 72. A plurality of plunger contacts 92 are concentrically arranged in the end 89 in a manner so that each plunger contact 92 contacts a receptacle contact 73 when the store 10 is secured in the aircraft. The contacts 92 are insulated from the clevis 23 by electrically non-conductive sheaths 93. Each plunger contact 92 is slidable in one of the sheaths 93 and is biased upward by an electrically conductive spring 94 which is soldered to the plunger contact 92 and to a lug 96 mounted at the bottom of the sheath 93. Conductors 97 in cable 71 are connected to the lugs 96.

When the store 10 is released, the band 12 becomes free at the end containing the band loop 37. An elastic cord or spring such as Bungee cord 98 is attached at one end to the release mechanism 13 by an eye fitting 99 and is stretched around the store 10 to another eye fitting 101 on band 12. As best illustrated in FIG. 1, which shows the band 12 at three sequential positions, *a*, *b* and *c*, when the band 12 is released at the band loop 37 and the store 10 is dropped, the free end of the band 12 is immediately retracted into the fuselage 11 in order to avoid whiplash or entaglement with airplane structure such as bomb bay doors.

It is contemplated that instead of shaft 14, an additional member 16 and the cartridge released elements therefor can be used, thus providing four points of release. This increases the reliability factor twofold. Even if only one cartridge should fire, the unexpended trunnion bolt 39 would yield under the load of store 10 to release the barrel 38.

The operation of the cincture-type suspension band apparatus will now be summarized. Prior to hoisting the store 10 into an aircraft, the barrel 38 is secured in the band loop 37 of the band 12 which in turn is placed in the member 16 and retained by the cartridge-fired trunnion bolts 39. The band 12 is wrapped around the store 10 with the release mechanism at the top and is tightly cinctured by the adjusting device 55. Electrical conductors 97 are connected between the electrical gear in the store 10 and the hoisting clevis 23, and the elastic cord 98 is then installed. The store 10 is now ready to be hoisted into an aircraft. As a bomb, it may be conveniently placed in storage until aircraft arming is necessary.

When placing the store 10 in the aircraft, the hoisting cables 27 are inserted into the clevises 22 and 23 and the store is hoisted upward until the grooves 29 are locked in hooks 33. The clevis 23 is concomitantly connected in receptacle 72 to complete the electrical circuits to the aircraft electrical gear. The cables 27 may then be removed since the hooks 33 will support the store 10.

The store 10 is remotely released by mechanically firing the low energy detonating cord or electrically energizing the ignition elements 49. Either means explodes the cartridges 44 to shear threads 41 and to project the trunnion bolts 39 inwardly, removing the sole bearing support between barrel 38 and member 16. The band 12 is thus released permitting the store 10 to drop by its own weight. The elastic cord 98 retracts the loose end of the band 12 upward toward the release mechanism 13.

It should now be apparent that the release mechanism 13 is an extremely simplified mechanism. The strong points which hold the trunnion bolts are also the strong points for securing the suspension system to the aircraft, for anti-sway bracing, for attaching the hoisting cables and for providing means for tying into handling equipment. Since all of the main supporting components are located at the same strong points, the very desirable feature of simplicity coupled with the elimination of eccentric loading conditions is attained. Furthermore, the supporting components being at the same point affords a considerable saving in weight and space.

It should be understood that the foregoing disclosure relates only to preferred embodiments of the invention and that numerous modifications and variations may be made therein without departing from the spirit and scope of the invention as set forth in the appended claims.

What is claimed is:

1. A cincture-type suspension band apparatus for hoisting, securing and releasing a store in an aircraft having a hoisting cable, comprising, in combination: a release mechanism adapted for being mounted at the top of the store, said mechanism having two members of equal length, crossties fixed to the ends of said members for disposing said members in parallel relation to the longitudinal axis of the store, the ends of said members being defined by external grooves for insertion in mating hooks fixed to the aircraft, said grooves and said hooks having tapered bearing surfaces for self-aligning the store as said mechanism is secured in the aircraft, one of said members including a channel between the ends of said one of said members, a barrel inserted in said channel, the bore of said barrel having a central portion of enlarged cross-section, each of said ends being further defined by a trunnion bolt bore having the same cross-sectional size and configuration as said bore, a relatively short trunnion bolt in each of said trunnion bolt bores and extending into said bore for retaining said barrel in said one of said members, an explosive cartridge in each of said ends outwardly disposed from said trunnion bolts for selectively and irreversibly ejecting said trunnion bolt from said trunnion bolt bore and into said central portion, ignition means for firing said cartridges, a band having a loop on one end thereof and adapted to be wrapped around the store, first means for connecting the other end of said band to the other of said members, said looped end connecting said band about said barrel, and third means connected to said crossties and adapted to be conected to the hoisting cable.

2. An apparatus as claimed in claim 1 wherein said first means further includes a band adjuster, said adjuster having a plurality of variable length eye bolts externally threaded at the straight end engaged in internal threads in an adjusting nut of the other of said members, a plurality of anchor fittings connected to the band and pivotally connected to the eye end of said eye bolts, and a spacer plate abutting said fittings and said other of said members for rigidly positioning said anchor fittings with respect to said member.

3. An apparatus as claimed in claim 1 wherein said third means further includes a plurality of electrically isolated contacts adapted to be connected to electrical gear in the store, an electrical receptacle fixed to the aircraft and having a plurality of electrically isolated contacts adapted to be connected to electrical gear in the aircraft, said third means and said receptacle positioned so that said electrical contacts, respectively, concomitantly connect the electrical gear of said store and said aircraft with securement of said mechanism in the aircraft.

4. An apparatus as claimed in claim 1, further comprising, an elastic cord connected at one end to said release mechanism, and connected at the other end to said other end of said band, whereby said other end of said band is retracted toward said release mechanism when the store is released.

5. A cincture-type suspension band apparatus for hoisting, securing and releasing a store in an aircraft having a hoisting cable, comprising, in combination: a release mechanism having four bearing surfaces thereunder disposed in spaced relationship to each other, said surfaces formed to abut the top of the store, groove means fixed at each of said surfaces, latch means formed to be fixed to the aircraft and disposed with respect to each of said groove means for securing said release mechanism to the aircraft at four distinct points, said groove means and said latch means having mating tapered fittings for self-aligning said release mechanism in the aircraft when secured thereto, a band adapted to be secured around the periphery of the store, connecting means for respectively securing both ends of said band to said release mechanism, at least one of said connecting means including an explosive cartridge-actuated means for selectively and irreversibly releasing one end of said band from said release mechanism, and clevis means connected to said release mechanism adapted for connecting to the hoisting cable.

6. An apparatus as claimed in claim 5 wherein said connecting means further includes a band adjuster, said adjuster having a turnbuckle-type device connected between one end of said band and said release mechanism for varying the apparatus circumference in accordance with the store size.

7. An apparatus as claimed in claim 5 wherein said clevis means further includes an electrical connector having an array of spring-biased plungers for concomitantly connecting corresponding leads of an umbilical cable between the store and the aircraft with securing of said mechanism in the aircraft.

8. An apparatus as claimed in claim 5, further comprising, an elastic cord connected to said release mechanism and to said band, whereby said band is retracted toward said release mechanism when the store is released.

9. An explosive cartridge-actuated release mechanism for disconnecting a load from a load-supporting structure, comprising: elongated first and second members secured to the load and to the load-supporting structure, respectively; said first member being hollow along the length thereof with reduced openings at the end portions; said second member being hollow along the length thereof and open on one side for longitudinally receiving said first member; bolt means of constant cross-section along its length slidably inserted into each of the adjacent ends of said first and second members for retaining said first member within said second member; explosive means in each end of said second member for firing said bolt means from the ends of said members into said first member; igniter means connected to said explosive means for selective ignition thereof; arrestor means centrally fixed within said first member for deflecting said bolt means; and vent means in said first member communicating between the inside and outside thereof.

References Cited in the file of this patent

UNITED STATES PATENTS

| | | |
|---|---|---|
| 2,413,635 | Lee | Dec. 31, 1946 |
| 2,462,744 | Hasselhorn | Feb. 22, 1949 |
| 2,679,783 | Smith | June 1, 1954 |
| 2,690,122 | Darnall et al. | Sept. 28, 1954 |
| 2,732,765 | Boyd | Jan. 31, 1956 |
| 2,750,842 | Myers | June 19, 1956 |
| 2,775,200 | Guenter | Dec. 25, 1956 |
| 2,889,746 | Glassman et al. | June 9, 1959 |
| 2,896,509 | Musgrave | July 28, 1959 |